Dec. 2, 1924.

H. M. GRAY ET AL

SHAFT MOUNTING

Filed Dec. 12, 1921

1,517,421

INVENTORS.
HORACE M. GRAY.
DAVID WILSON.
BY
ATTORNEYS

Patented Dec. 2, 1924.

1,517,421

UNITED STATES PATENT OFFICE.

HORACE M. GRAY AND DAVID WILSON, OF ANDERSON, INDIANA.

SHAFT MOUNTING.

Application filed December 12, 1921. Serial No. 521,783.

*To all whom it may concern:*

Be it known that we, HORACE M. GRAY and DAVID WILSON, respectively, citizens of the United States, and residents of Anderson, county of Madison, and State of Indiana, have invented a certain new and useful Shaft Mounting; and we do hereby declare that the following is a full, clear, and exact description thereof, reference being had to the accompanying drawings, in which like numerals refer to like parts.

This invention relates to a mechanism for controlling a dirgible headlight for vehicles so as to cause it to swing horizontally, throwing a beam in a line parallel with the front wheels or trucks of a vehicle, whereby a change in direction of travel will be followed.

The main object of the invention is to so mount a headlight upon the front of a vehicle as to permit a swivel thereon about a horizontal plane, and so connect the pivotally mounted support of the headlight with the front wheels or trucks of a vehicle as to cause said headlight to turn with said wheels or trucks so as to direct the beam of light in a line parallel with the direction of movement thereof.

One feature of the invention lies in the mounting for the headlight, whereby it will be firmly seated and movable in a horizontal plane about a vertical axis upon ball bearings, the lamp being held firmly by a construction including a heavy spring and associated parts for preventing vibration or the movement thereof unless actuated by the controlling mechanism.

Another feature of the invention comprises the actuating mechanism connecting the lamp mounting with the wheels or trucks for causing it to turn with the movement thereof, said means being arranged to permit a slight movement of the wheels or trucks, due to the inequalities in the road surface without affecting the lamp or causing it to deviate from a given position.

The full nature of the invention will be understood from the accompanying drawings and the following description and claims.

Figure 1:
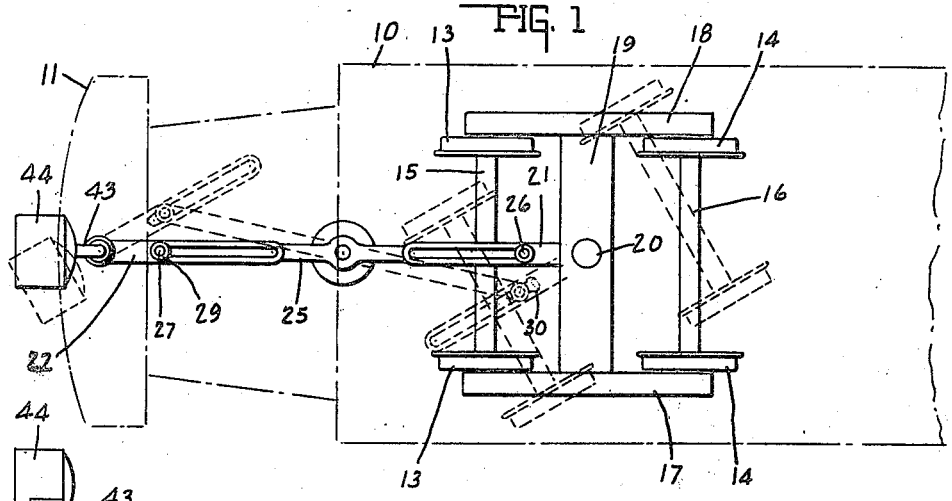
Figure 2:
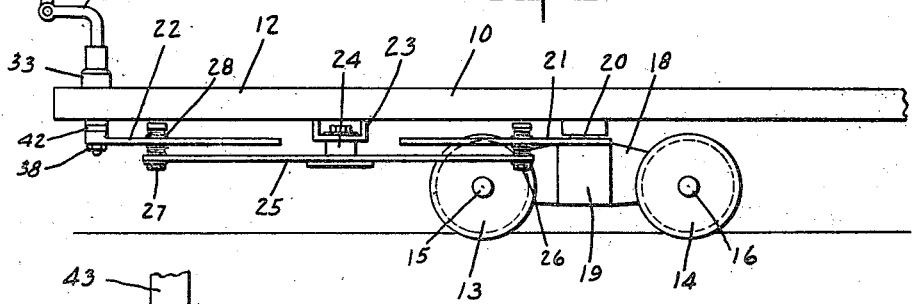
Figure 3:
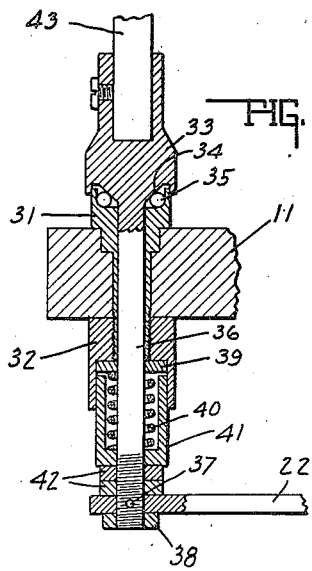

In the drawings, Fig. 1 is a plan view looking down upon an electrically driven trolley car with parts thereof removed for showing the trucks and actuating mechanism in normal position, and in turning position as shown in dotted lines. Fig 2 is a side elevation of the trucks and actuating mechanism in normal position. Fig. 3 is an enlarged view of a central vertical section taken through the headlight mounting.

In the drawings there is shown the outline of a trolley car 10 having a front cross beam or bumper 11 and longitudinal supporting beams 12. The car and supporting beams are mounted upon suitable trucks of the usual construction, of which only the front trucks are shown herein. Said trucks comprise the flanged wheels 13 and 14 mounted in pairs on each end of the front and rear axles 15 and 16, said axles being supported at each end in suitable journal boxes mounted in the side bearing plates 17 and 18 connected centrally by the supporting cross beam 19 upon which the car frame is pivotally mounted at 20. With this usual construction the trucks are permitted to turn with respect to the frame and body of the car, as shown in the dotted lines in Fig. 1.

Rigidly connected with the cross beam at its center and extending forwardly therefrom, there is a slotted actuating bar 21 arranged to move with the truck about an arc having the pivot point 20 as its center. At the forward end of the frame and rigidly connected to the spindle of the headlight mounting at one end, there is a similar bar 22 suitably slotted. Midway between said bars and secured to the under side of the car frame, there is a bracket 23 carrying a pivot member 24 upon which the connecting rod 25 is supported and pivotally mounted at its center. At each end of the connecting rod, there are bolts 26 and 27 loosely extending through each end of the connecting rod 25 and the slots in the bars 21 and 22 respectively so as to be slidable therein. In order to compensate for any variable movement between the truck and supporting frame of the car, said bolts are provided with spring cushions 28 positioned between the connecting rod and bars and between the bars and the extreme ends of the bolts with bearing washers 29 mounted on said bolt on either side of said bars of a diameter appreciably greater than the width of the slots therein. The slots in the bars are slightly of greater width than the diameter of the bolts 26 and 27 so as to permit them to freely slide therein and prevent any vibration or slight movement of the trucks from transmitting such movement to the headlight. To compensate for the unevenness in the road-bed and appreciable movement of the wheels of the vehicle, when traveling in a straight line, said slots are of considerable width at their ends, wherein the bolts 27 normally rest, as shown at 30 in Fig. 1. By means of this arrangement as the truck takes a turn on the road, it is swiveled about the pivot point 20 of the frame of the car, as shown in dotted lines in Fig. 1, carrying the bar 21 with it which causes the connecting rod 25 to swivel about its pivot point and move the bar 22 to a new position parallel with the rod 21, said bar 22 causing the lamp bracket to turn so as to direct the light in a parallel line to the line taken by said trucks.

The mounting of the headlight comprises a bearing member 31 mounted vertically in the front cross beam 11 of the car frame, said member having a ball race on its upper end and a tubular extension passing downwardly through the beam 11. For securing the member 31 in position, there is a sleeve 32 adapted to be screwed upon the end of the tubular extension beneath the cross beam for clamping it rigidly thereon. Mounted on the bearing member 31, there is a lamp bracket socket 33 having a cone bearing portion 34 adapted to rest in the cup of the ball race of said bearing member upon the ball bearings 35 so as to readily pivot thereon. Integral with the socket 33, there is a spindle 36 extending through the tubular extension of the member 31 downwardly below the beam to which the rod 22 is rigidly connected by the pin 37 and the nut 38. Surrounding said spindle between the rod 22 and the sleeve 32, there is positioned a washer 39 adjacent said sleeve against which a heavy cylindrical spring 40 is adapted to abut, said spring being positioned in the cup 41 which is telescopically positioned in the sleeve 32 and is held therein by suitable washers 42 mounted between said cup and rod 22. By means of this arrangement, the spring 40 at all times yieldingly retains the socket 33 upon the ball bearing mounting of the bearing 31, eliminating any vibration therein. Secured in the socket 33, there is a lamp bracket 43 upon which is rigidly mounted the dirigible head lamp 44 which will be caused to swing in a parallel plane by the movement of the spindle 36 caused by the movement of the wheels or trucks of the vehicle.

The invention claimed is:

A shaft mounting comprising an apertured base, a bushing stationarily secured therein including an enlarged head with an enlarged opening therein and a threaded opposite end, a spindle pivotally mounted in said bushing and projecting therethrough and including an enlargement for closing said bushing enlarged recess, an anti-friction construction between said spindle and said bushing and positioned in said enlarged recess, a nut securing said bushing to said base and having a tubular extension projecting beyond said bushing, a coiled spring in said tubular extension surrounding said spindle, a cup mounted on said spindle and telescopically associated with said tubular extension for enclosing and retaining said spring, and actuating means connected to the spindle for causing the same to swivel upon the anti-friction bearing.

In witness whereof, we have hereunto affixed our signatures.

HORACE M. GRAY.
DAVID WILSON.